(12) United States Patent
Matsumoto et al.

(10) Patent No.: US 9,977,196 B2
(45) Date of Patent: May 22, 2018

(54) OPTICAL CONNECTOR AND METHOD FOR CONNECTING OPTICAL FIBER CABLES

(71) Applicant: HIROSE ELECTRIC CO., LTD., Tokyo (JP)

(72) Inventors: Shinichi Matsumoto, Tokyo (JP); Yoshiyuki Hiyama, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/474,209

(22) Filed: Mar. 30, 2017

(65) Prior Publication Data
US 2017/0285274 A1 Oct. 5, 2017

(30) Foreign Application Priority Data
Apr. 4, 2016 (JP) .................................. 2016-075048

(51) Int. Cl.
*G02B 6/38* (2006.01)

(52) U.S. Cl.
CPC ......... *G02B 6/3874* (2013.01); *G02B 6/3821* (2013.01); *G02B 6/3851* (2013.01); *G02B 6/3893* (2013.01)

(58) Field of Classification Search
CPC ................................ G02B 6/38; G02B 6/3874
USPC .......................................................... 385/60
See application file for complete search history.

(56) References Cited

U.S. PATENT DOCUMENTS

| | | | | |
|---|---|---|---|---|
| 4,892,379 A * | 1/1990 | Takeda | ................. | G02B 6/3877 385/60 |
| 5,390,270 A * | 2/1995 | Hanzawa | ............. | G02B 6/3855 385/136 |
| 5,673,346 A * | 9/1997 | Iwano | .................. | G02B 6/3817 385/60 |
| 8,956,056 B2 * | 2/2015 | Katagiyama | ......... | G02B 6/3885 385/72 |
| 2002/0172471 A1 * | 11/2002 | Slater | ................... | G02B 6/3877 385/78 |
| 2008/0124029 A1 * | 5/2008 | Mitamura | ............ | G02B 6/3874 385/60 |
| 2008/0170827 A1 * | 7/2008 | Mitamura | ............ | G02B 6/3846 385/78 |
| 2013/0071063 A1 * | 3/2013 | Aoki | ........................ | G02B 6/32 385/33 |

(Continued)

FOREIGN PATENT DOCUMENTS

JP  H09-258065  10/1997

*Primary Examiner* — Kaveh C Kianni
(74) *Attorney, Agent, or Firm* — Rankin, Hill & Clark LLP

(57) ABSTRACT

An optical connector includes a sleeve that positions a front end portion of a first ferrule and a front end portion of a second ferrule so as to face each other on the same axis, a first connection retaining member and a second connection retaining member that maintain a state in which the front end portions of the first and second ferrules contact each other and press against each other, and a coil spring that generates a force with which the front end portions of the first and second ferrules press against each other. Optical fiber cables can be connected to each other by containing the first ferrule and the second ferrule, which are attached to the sleeve, respectively in the first connection retaining member and the second connection retaining member and by coupling the first connection retaining member and the second connection retaining member to each other.

5 Claims, 5 Drawing Sheets

(56) References Cited

U.S. PATENT DOCUMENTS

2014/0147082 A1* 5/2014 Lee ..................... G02B 6/3825
                                                      385/78

* cited by examiner

OPTICAL CONNECTOR AND METHOD FOR CONNECTING OPTICAL FIBER CABLES

BACKGROUND OF THE INVENTION

1. Field of the Invention

The present invention relates to an optical connector for connecting optical fiber cables to each other and a method for connecting optical fiber cables.

2. Description of the Related Art

In general, optical fiber cables are connected to each other by coupling optical connectors, which are attached to end portions of the optical fiber cables, to each other via a relay adapter.

That is, a ferrule, which is attached to the end portion of a corresponding one of the optical fiber cables, is contained in each of the optical connectors. In each of the optical connectors, the ferrule is pressed by an elastic member, such as a coil spring, in the axial direction toward a front end of the optical connector.

One of the optical connectors is connected to the relay adapter from one side of the relay adapter to be engaged with the relay adapter, and the other optical connector is connected to the relay adapter from the opposite side of the relay adapter to be engaged with the relay adapter. When the optical connectors are connected to and engaged with the relay adapter, front end portions of the pair of ferrules are positioned so as to face each other on the same axis in the relay adapter. In the relay adapter, the front ends of the pair of ferrules contact each other and press against each other. A force with which the front ends of the pair of ferrules press against each other is generated by the elastic members disposed in the optical connectors.

When the front ends of the pair of ferrules press against each other on the same axis, physical contact is formed between end surfaces of the optical fibers, which are exposed at central portions of front end surfaces of the ferrules. Thus, efficient transmission of optical signals between optical fibers of the optical fiber cables is realized.

Japanese Unexamined Patent Application Publication No. 9-258065 describes an optical repeater for connecting optical fiber cables to each other.

As described above, with the existing general technology, in order to connect optical fiber cables to each other, it is necessary to use a pair of optical connectors connected to end portions of the optical fiber cables and a relay adapter for coupling the optical connectors to each other. Each of the optical connectors includes an independent housing, a support structure that is disposed in the housing and that supports a ferrule, a structure that is disposed in the housing and that supports an elastic member that presses the ferrule toward a front end of the optical connector, and a structure that engages the housing with the relay adapter. The relay adapter includes an independent housing, a structure that is disposed in the housing and that positions front end portions of the ferrules of the optical connectors relative to each other on the same axis, and a structure that engages the housings of the two optical connectors with the housing of the relay adapter so as to face each other. Thus, in the existing general technology, the optical connectors and the relay adapter each have a complex structure and therefore have a large size, and require high manufacturing costs.

In this respect, the optical repeater described in Japanese Unexamined Patent Application Publication No. 9-258065 includes a cap that separably contains a base portion of a ferrule at an end portion of an optical fiber, that is removably engaged with the a relay adapter by using an engagement means, and that supports an urging means that urges the ferrule, which is inserted from one end of a sleeve, toward the other end of the sleeve relative to the relay adapter when the cap is engaged with the relay adapter. Japanese Unexamined Patent Application Publication No. 9-258065 describes that, by using the optical repeater, optical fiber cables can be connected to the relay adapter without using a large space and without attaching male connectors to end portions of the optical fiber cables.

However, the optical repeater described in Japanese Unexamined Patent Application Publication No. 9-258065 is the same as the existing general technology in that it is necessary to use a pair of optical connectors and a relay adapter to connect optical fiber cables to each other. Moreover, the optical repeater is the same as the existing general technology in that each of the optical connectors includes a housing, which has structures for supporting a ferrule and an elastic member, and a structure for engaging the housing with the relay adapter. Furthermore, the optical repeater is the same as the existing general technology in that the relay adapter includes an independent housing that positions front end portions of the ferrules of the optical connectors and a structure that engages the housings of the two optical connectors with the housing of the relay adapter so as to face each other. Thus, although the optical repeater described in Japanese Unexamined Patent Application Publication No. 9-258065 has slightly simplified structures for supporting the ferrule and the elastic member in the housing (cap) of each of the optical connectors, the optical repeater still has a complex structure as a whole, and therefore it is not easy to reduce the size and the cost of the optical repeater.

SUMMARY OF THE INVENTION

The present invention has been devised to solve, for example, the problem described above. An object of the present invention is to provide an optical connector that can be simplified in structure and reduced in size and cost and a method for connecting optical fiber cables by using the optical connector.

To solve the above problem, a first optical connector according to the present invention includes a positioning member that is attached to a front end portion of a first ferrule attached to a first optical fiber cable and to a front end portion of a second ferrule attached to a second optical fiber cable, the positioning member positioning the front end portion of the first ferrule and the front end portion of the second ferrule so as to face each other on the same axis; a first connection retaining member and a second connection retaining member that maintain a state in which the front end portion of the first ferrule and the front end portion of the second ferrule contact each other and press against each other; and an elastic member that generates a force with which the front end portion of the first ferrule and the front end portion of the second ferrule press against each other. The first connection retaining member includes a first housing; a first containing portion that is a hole extending through a central portion of the first housing in an axial direction and that contains therein the first ferrule to which the positioning member is attached; a first pressing portion that is disposed in the first housing and that presses the first ferrule contained in the first containing portion toward the second ferrule in the axial direction; a first coupling portion that is disposed on the first housing and that is separably coupled to the second connection retaining member; and a first slit that extends through a peripheral portion of the first housing in the axial direction, that connects an inside of the first containing portion and an outside of the first housing to each other, and that has a width greater than or equal to an outside diameter of the first optical fiber cable. The second connection retaining member includes a second housing; a second containing portion that is a hole extending through a central portion of the second housing in the axial direction and that contains therein the second ferrule to which the positioning member is attached; a second pressing portion that is disposed in the second housing and that presses the second ferrule contained in the second containing portion toward the first ferrule in the axial direction; a second coupling portion that is disposed in the second housing and that is separably coupled to the first coupling portion; and a second slit that extends through a peripheral portion of the second housing in the axial direction, that connects an inside of the second containing portion and an outside of the second housing to each other, and that has a width greater than or equal to an outside diameter of the second optical fiber cable. The elastic member is disposed at at least one of a position between the first ferrule and the first pressing portion and a position between the second ferrule and the second pressing portion.

With this aspect of the present invention, the first ferrule and the second ferrule, which are positioned by the positioning member so that the front end portions face each other on the same axis, are respectively contained in the first housing of the first connection retaining member and the second housing of the second connection retaining member, and, in this state, the first coupling portion of the first connection retaining member and the second coupling portion second connection retaining member are coupled to each other. If the elastic member is disposed between the first ferrule and the first pressing portion, by coupling the first coupling portion and the second coupling portion to each other, the elastic member elastically deforms by being pressed by the first pressing portion and the first ferrule is pressed by the elastic member toward the second ferrule, and, accordingly, the second ferrule is pressed by the second pressing portion toward the first ferrule. (If the elastic member is disposed between the second ferrule and the second pressing portion, by coupling the first coupling portion and the second coupling portion to each other, the elastic member elastically deforms by being pressed by the second pressing portion and the second ferrule is pressed by the elastic member toward the first ferrule, and, accordingly, the first ferrule is pressed by the first pressing portion toward the second ferrule.) As a result, the front end portion of the first ferrule and the front end portion of the second ferrule contact each other and press against each other, so that physical contact is formed between the optical fiber of the first optical fiber cable and the optical fiber of the second optical fiber cable. With exiting technologies, in order to connect optical fiber cables to each other, it is necessary to use a relay adapter including an independent housing having a structure for positioning front end portions of respective ferrules and a structure that engages housings of two optical connectors with the housing of the relay adapter so as to face each other. In contrast, with the optical connector according to this aspect of the present invention, such a relay adapter is not necessary and can be omitted. Accordingly, it is possible to simplify the structure of the optical connector and to reduce the size and the cost of the optical connector.

The first housing has the first slit. Therefore, by passing the first optical fiber cable through the first slit, it is possible to remove the first connection retaining member from the first ferrule and to attach the first connection retaining member to the first ferrule while maintaining a state in which the first ferrule is attached to the first optical fiber cable. Likewise, the second housing has the second slit. Therefore, it is possible to remove the second connection retaining member from the second ferrule and to attach the second connection retaining member to the second ferrule while maintaining a state in which the second ferrule is attached to the second optical fiber cable. Accordingly, it is possible to easily disassemble or assemble the optical connector and to easily perform maintenance operations, such as replacement of the optical fiber cables.

In the first optical connector according to the present invention, preferably, the first pressing portion is a step portion where a diameter of the hole that forms the first containing portion is reduced, and the second pressing portion is a step portion where a diameter of the hole that forms the second containing portion is reduced.

With this aspect of the present invention, it is possible to simplify a structure for causing the front end portion of the first ferrule and the front end portion of the second ferrule to contact each other and press against each other.

In the first optical connector according to the present invention, preferably, the first coupling portion protrudes from a front end portion of the first housing in the axial direction, the second coupling portion is a hole formed in a front end portion of the second housing so as to extend in the axial direction, and the first coupling portion and the second coupling portion are coupled to each other as the first coupling portion is fitted into the second coupling portion.

With this aspect of the present invention, it is possible to simplify a structure for coupling the first connection retaining member and the second connection retaining member to each other.

In the first optical connector according to the present invention, preferably, the first coupling portion and the second coupling portion each include an engagement mechanism that maintains a state in which the first coupling portion and the second coupling portion are coupled to each other.

With this aspect of the present invention, it is possible to simplify a structure for maintaining a state in which the first connection retaining member and the second connection retaining member are coupled to each other.

In the first optical connector according to the present invention, preferably, the positioning member has a cylindrical shape or a bar-like shape having a C-shaped cross section, and the positioning member is contained in the first connection retaining member or in the second connection retaining member in a state in which the front end portion of the first ferrule is inserted into the positioning member from one end portion of the positioning member and the front end portion of the second ferrule is inserted into the positioning member from the other end portion of the positioning member.

With this aspect of the present invention, it is possible to simplify a structure for positioning the front end portion of the first ferrule and the front end portion of the second ferrule.

To solve the above problem, a second optical connector according to the present invention includes a positioning member that is attached to a front end portion of a ferrule attached to an optical fiber cable, the positioning member positioning the front end portion of the ferrule so as to face a front end portion of a mating ferrule on the same axis; a connection retaining member that maintains, by being coupled to a mating ferrule holding member that holds the mating ferrule, a state in which the front end portion of the ferrule contacts the front end portion of the mating ferrule while applying a pressing force to the front end portion of the mating ferrule; and an elastic member that generates the pressing force that the front end portion of the ferrule applies to the front end portion of the mating ferrule. The connection retaining member includes a housing; a containing portion that is a hole extending through a central portion of the housing in an axial direction and that contains therein the ferrule to which the positioning member is attached; a pressing portion that is disposed in the housing and that presses the ferrule contained in the containing portion toward the mating ferrule in the axial direction, a coupling portion that is disposed on the housing and that is separably coupled to the mating ferrule holding member; and a slit that extends through a peripheral portion of the housing in the axial direction, that connects an inside of the containing portion and an outside of the housing to each other, and that has a width greater than or equal to an outside diameter of the optical fiber cable. The elastic member is disposed at a position between the ferrule and the pressing portion.

With this aspect of the present invention, an existing relay adapter, which has a complex structure as described above, can be omitted, and therefore it is possible to simplify the structure of the optical connector and to reduce the size and the cost of the optical connector. Because the housing has the slit, it is possible to remove the connection retaining member from the ferrule and to attach the connection retaining member to the ferrule while maintaining a state in which the ferrule is attached to the optical fiber cable. Accordingly, it is possible to easily disassemble or assemble the optical connector and to easily perform maintenance operations, such as replacement of the optical fiber cables.

In the second optical connector according to the present invention, preferably, the pressing portion is a step portion where a diameter of the hole that forms the containing portion is reduced.

With this aspect of the present invention, it is possible to simplify a structure for causing the front end portion of the ferrule and the front end portion of the mating ferrule to contact each other and press against each other.

In the second optical connector according to the present invention, preferably, the coupling portion includes an engagement mechanism that maintains a state in which the coupling portion is coupled to the mating ferrule holding member.

With this aspect of the present invention, it is possible to simplify a structure for maintaining a state in which the connection retaining member and the mating ferrule holding member are coupled to each other.

In the second optical connector according to the present invention, preferably, the positioning member has a cylindrical shape or a bar-like shape having a C-shaped cross section, and the front end portion of the ferrule is inserted into the positioning member.

With this aspect of the present invention, it is possible to simplify a structure for positioning the front end portion of the ferrule and the front end portion of the mating ferrule.

To solve the above problem, a method for connecting a first optical fiber cable and a second optical fiber cable to each other according to the present invention uses an optical connector that includes a positioning member that positions a front end portion of a first ferrule and a front end portion of a second ferrule, a first connection retaining member including a first containing portion and a first slit that connects an inside of the first containing portion and an outside of the first containing portion to each other, a second connection retaining member including a second containing portion and a second slit that connects an inside of the second containing portion and an outside of the second containing portion to each other, an elastic member, and an engagement mechanism that engages the first connection retaining member and the second connection retaining member with each other. The method includes a positioning step of positioning the front end portion of the first ferrule and the front end portion of the second ferrule so as to face each other on the same axis by attaching the front end portion of the first ferrule, to a rear end portion of which the first optical fiber cable and the elastic member are attached, to one end portion of the positioning member and by attaching the front end portion of the second ferrule, to a rear end portion of which the second optical fiber cable is attached, to the other end portion of the positioning member; a containing step of passing the first optical fiber cable through the first slit and placing the first ferrule, which has been attached to the one end portion of the positioning member, and the elastic member into the first containing portion, and passing the second optical fiber cable through the second slit and placing the second ferrule, which has been attached to the other end portion of the positioning member, into the second containing portion; a pressing step of causing the front end portion of the first ferrule and the front end portion of the second ferrule to contact each other and press against each other by pressing the first connection retaining member and the second connection retaining member against each other and elastically deforming the elastic member while placing the positioning member into the first connection retaining member or into the second connection retaining member; and an engagement step of engaging the first connection retaining member and the second connection retaining member with each other by using the engagement mechanism while maintaining a state in which the front end portion of the first ferrule and front end portion of the second ferrule contact each other and press against each other.

With this aspect of the present invention, after attaching the first optical fiber cable and the elastic member to the first ferrule and attaching the second optical fiber cable to the second ferrule, it possible to assemble together the optical connector by assembling the first ferrule, the second ferrule, the positioning member, the first connection retaining member, and the second connection retaining member. Thus, the first optical fiber cable and the second optical fiber cable can be connected to each other. Therefore, when connecting the first optical fiber cable and the second optical fiber cable to each other or separating the first optical fiber cable and the second optical fiber cable from each other, it is possible to easily assemble or disassemble the optical connector, and therefore it is possible to easily perform maintenance operations, such as replacement of the optical fiber cables.

With the present invention, it is possible to simplify the structure of an optical connector for connecting optical fibers cables to each other, and therefore it is possible to reduce the size and the cost of the optical connector.

DESCRIPTION OF THE PREFERRED EMBODIMENTS

Figure 1:
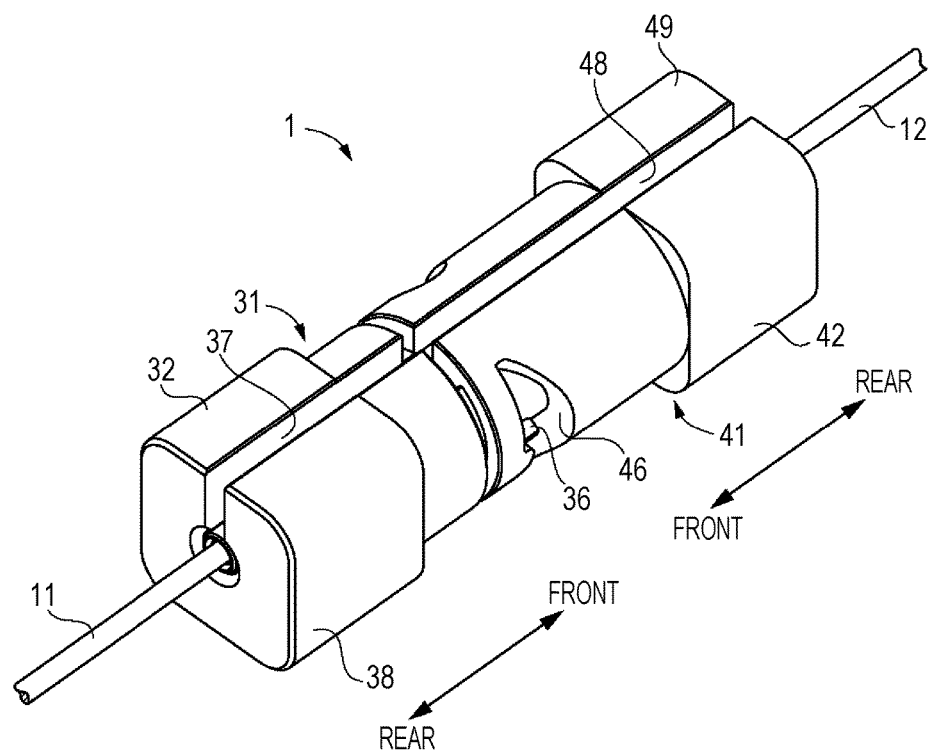
FIG. 1 is an external perspective view of an optical connector according to an embodiment of the present invention.
Figure 2:
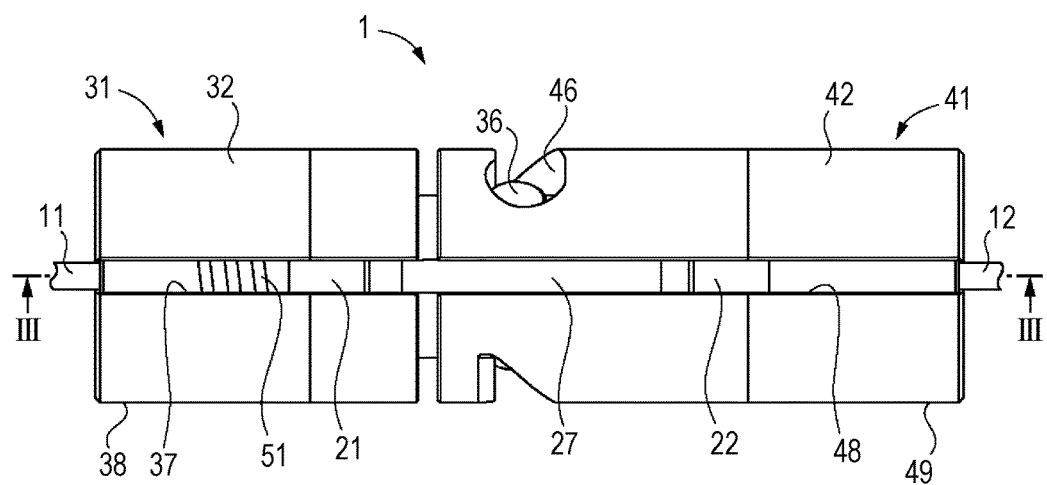
FIG. 2 is an external view of the optical connector, seen from above in FIG. 1.
Figure 3:
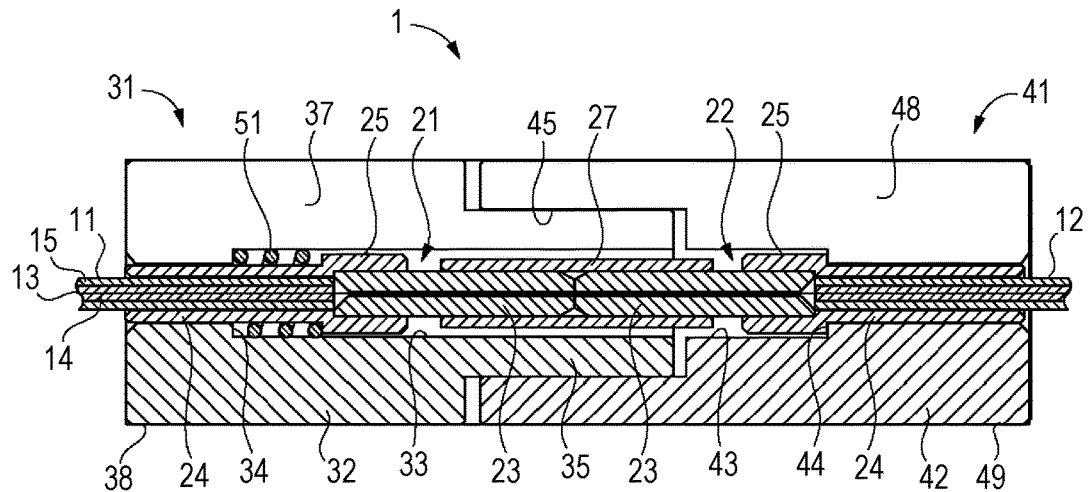
FIG. 3 is a sectional view of the optical connector, taken along line III-III in FIG. 2.
Figure 4:
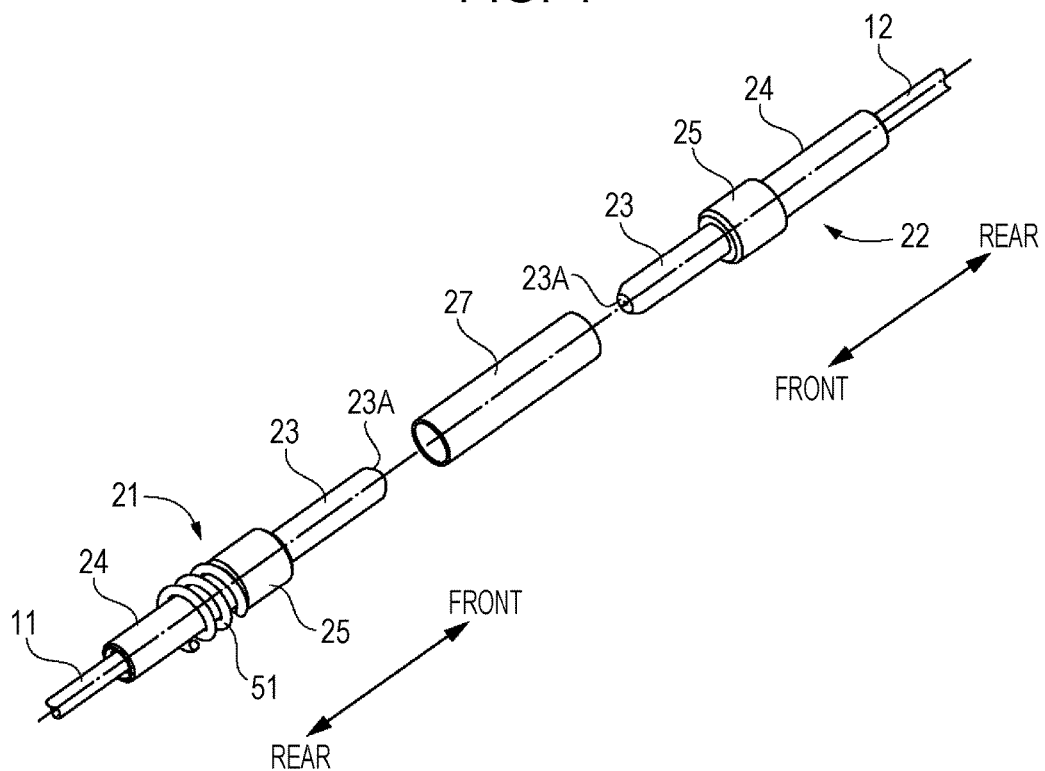
FIG. 4 is a perspective view illustrating a first ferrule, a second ferrule, a sleeve, a coil spring, and other components of the optical connector according to the embodiment of the present invention.

FIGS. 1 to 3 illustrate an optical connector 1 according to an embodiment of the present invention. To be specific, FIG. 1 is an external perspective view of the optical connector 1; FIG. 2 is an external view of the optical connector 1, seen from above in FIG. 1; and FIG. 3 is a sectional view of the optical connector 1, taken along line III-III in FIG. 2. FIG. 4 illustrates a first ferrule 21, a second ferrule 22, a sleeve 27, a coil spring 51, and other components of the optical connector 1. For convenience of description, as illustrated in FIG. 1, in a first connection retaining member 31 of the optical connector 1, a portion that is coupled to a second connection retaining member 41 will be referred to as a front end portion, and a portion opposite to the front end portion will be referred to as a rear end portion. In the second connection retaining member 41 of the optical connector 1, a portion that is coupled to the first connection retaining member 31 will be referred to as a front end portion, and a portion opposite to the front end portion will be referred to as a rear end portion. Referring to FIG. 4, in the first ferrule 21, a portion facing the second ferrule 22 will be referred to as a front end portion, and a portion opposite to the front end portion will be referred to as a rear end portion. In the second ferrule 22, a portion facing the first ferrule 21 will be referred to as a front end portion, and a portion opposite to the front end portion will be referred to as a rear end portion.

Referring to FIG. 1, the optical connector 1 according to the embodiment of the present invention connects optical fiber cables 11 and 12 to each other. Referring to FIG. 3, the first optical fiber cable 11 includes a single core optical fiber. The first optical fiber cable 11 is formed by covering the outer periphery of an optical fiber 13 with a primary coating 14 and covering the outer periphery of the primary coating 14 with a secondary coating 15. The second optical fiber cable 12 is formed in the same way as the first optical fiber cable 11.

Referring to FIG. 4, the first ferrule 21 is attached to an end portion of the first optical fiber cable 11. The first ferrule 21 includes a capillary 23 and a capillary supporting portion 24.

The capillary 23 supports and positions the optical fiber 13. The capillary 23 is made of, for example, a ceramic such as zirconia, glass, or the like. The capillary 23 has a cylindrical shape and has a small-diameter hole extending through the center thereof in the axial direction.

The capillary supporting portion 24 supports the capillary 23. The capillary supporting portion 24 has a cylindrical shape and is made of, for example, a metal such as a stainless steel. The capillary 23 is attached to the inside of a front end portion of the capillary supporting portion 24. A flange portion 25 is formed on the outside of the front end portion of the capillary supporting portion 24. That is, in the outer periphery of the capillary supporting portion 24, the front end portion of the capillary supporting portion 24 protrudes further outward in the radial direction than a rear end portion of the capillary supporting portion 24 around the entire periphery. The protruding flange-shaped portion is the flange portion 25.

Referring to FIG. 3, the first optical fiber cable 11 is inserted into a central portion of the first ferrule 21. To be specific, the entirety of an end portion of the first optical fiber cable 11 is inserted into the rear end portion of the capillary supporting portion 24. The optical fiber 13, which is exposed by stripping the primary coating 14 and the secondary coating 15 from the end portion of the first optical fiber cable 11, is inserted into a hole formed inside the front end portion of the capillary supporting portion 24 and into a hole formed at the center of the capillary 23. A front end surface 23A of the capillary 23 has a dome-like shape and is mirror-polished. An end surface of the optical fiber 13 is exposed at a central portion of the front end surface 23A.

Referring to FIG. 4, the second ferrule 22 is attached to an end portion of the second optical fiber cable 12. The second ferrule 22 has the same structure and the same size as the first ferrule 21.

Referring to FIG. 3, the optical connector 1 includes the sleeve 27, the first connection retaining member 31, the second connection retaining member 41, and the coil spring 51.

Referring to FIG. 4, the sleeve 27 has a function of positioning a front end portion of the capillary 23 of the first ferrule 21 and a front end portion of the capillary 23 of the second ferrule 22 on the same axis so as to face each other. To be specific, the sleeve 27 matches the optical axis of the optical fiber 13 of the first optical fiber cable 11 attached to the first ferrule 21 with the optical axis of the optical fiber 13 of the second optical fiber cable 12 attached to the second ferrule 22. The sleeve 27 causes the end surface of the optical fiber 13 of the first optical fiber cable 11, which is exposed at the front end surface 23A of the capillary 23 of the first ferrule 21, and the end surface of the optical fiber 13 of the second optical fiber cable 12, which is exposed at the front end surface 23A of the capillary 23 of the second ferrule 22, to closely contact each other so as to form physical contact between the optical fibers 13. The sleeve 27 is a specific example of a "positioning member".

In the present embodiment, the sleeve 27 has a cylindrical shape and is made of a metal, such as a stainless steel. The inside diameter of the sleeve 27 is equal to or slightly greater than the outside diameter of each of the capillary 23 of the first ferrule 21 and the capillary 23 of the second ferrule 22. Referring to FIG. 3, the front end portion of the capillary 23 of the first ferrule 21 is inserted into the sleeve 27 from one end of the sleeve 27. The front end portion of the capillary 23 of the second ferrule 22 is inserted into the sleeve 27 from the other end of the sleeve 27. The sleeve 27, into which the capillaries 23 of the first ferrule 21 and the second ferrule 22 are inserted, is contained in a fitting portion 35 of the first connection retaining member 31.

Figure 5:
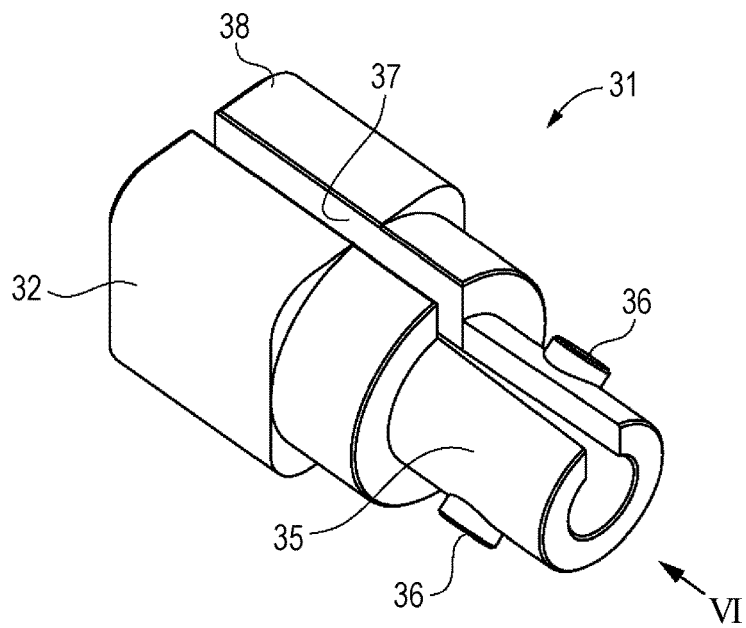
FIG. 5 is an external perspective view of a first connection retaining member of the optical connector according to the embodiment of the present invention.
Figure 6:
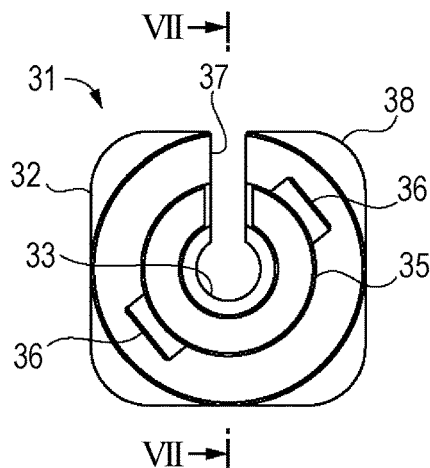
FIG. 6 is an external view of the first connection retaining member, seen in the direction of arrow VI in FIG. 5.
Figure 7:
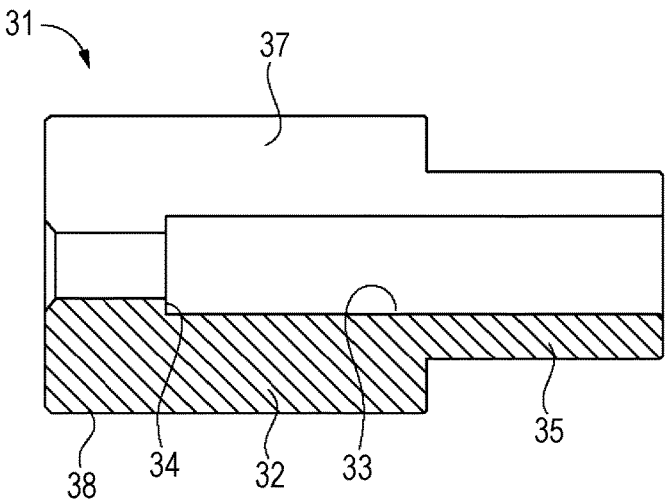
FIG. 7 is a sectional view of the first connection retaining member, taken along line VII-VII in FIG. 6.

The first connection retaining member 31 and the second connection retaining member 41 maintain a state in which the front end surface 23A of the capillary 23 of the first ferrule 21 and the front end surface 23A of the capillary 23 of the second ferrule 22 contact each other and press against each other. FIGS. 5 to 7 illustrate the first connection retaining member 31. To be specific, FIG. 5 is an external perspective view of the first connection retaining member 31; FIG. 6 is an external view of the first connection retaining member 31, seen in the direction of arrow VI in FIG. 5; and FIG. 7 is a sectional view of the first connection retaining member 31, taken along line VII-VII in FIG. 6.

The first connection retaining member 31 basically has the following functions: a function of forming an outer shell of the optical connector 1; a function of containing and supporting the first ferrule 21; and a function of, in cooperation of the second connection retaining member 41, causing the front end surface 23A of the capillary 23 of the first ferrule 21 and the front end surface 23A of the capillary 23 of the second ferrule 22 to contact each other, causing the front end surfaces 23A to press against each other with a predetermined pressing force, and maintaining a state in which the front end surfaces 23A contact each other and press against each other.

Referring to FIG. 5, the first connection retaining member 31 includes a first housing 32. The first housing 32 is made of, for example, a resin material. The first housing 32 has a columnar shape as a whole. Referring to FIG. 7, a hole is formed in the first housing 32 so as to extend through a central portion of the first housing 32 in the axial direction, and a first ferrule containing portion 33 is formed in the hole. The first ferrule containing portion 33 is a circular hole. The diameter of a part the first ferrule containing portion 33 on the front side of a first step portion 34 is greater than the outside diameter of the flange portion 25 of the capillary supporting portion 24 of the first ferrule 21, the outside diameter of the coil spring 51, and the outside diameter of the sleeve 27. In the present embodiment, the diameter of this part of the first ferrule containing portion 33 is slightly grater than the outside diameter of the flange portion 25 of the capillary supporting portion 24 of the first ferrule 21 or the outside diameter of the coil spring 51. Referring to FIG. 3, the first ferrule 21, to which the sleeve 27 is attached, and the coil spring 51 are contained in the first ferrule containing portion 33. The first ferrule containing portion 33 is a specific example of a "first containing portion".

Referring to FIG. 7, in the first housing 32, the first step portion 34 is disposed in a rear end portion of the first ferrule containing portion 33. The first step portion 34 has a function of pressing the first ferrule 21, which is contained in the first ferrule containing portion 33, toward the second ferrule 22 in the axial direction via the coil spring 51. The first step portion 34 is formed by reducing the diameter of a rear end portion of the hole that forms the first ferrule containing portion 33. Referring to FIG. 3, the coil spring 51 is disposed between the first step portion 34 and the flange portion 25 of the first ferrule 21, which is contained in the first ferrule containing portion 33. A rear end portion of the coil spring 51 is in contact with the first step portion 34. The first step portion 34 is a specific example of a "first pressing portion".

The diameter of a rear end portion of the first ferrule containing portion 33 on the rear side of the first step portion 34 is smaller than the diameter of a front end portion of the first ferrule containing portion 33 on the front side of the first step portion 34. The diameter of the rear end portion of the first ferrule containing portion 33 is equal to or slightly greater than the outside diameter of the rear end portion of the capillary supporting portion 24 of the first ferrule 21 (on which the flange portion 25 is not formed). The rear end portion of the capillary supporting portion 24 of the first ferrule 21 is fitted into the rear end portion of the first ferrule containing portion 33. The rear end portion of the capillary supporting portion 24 of the first ferrule 21 is supported by the rear end portion of the first ferrule containing portion 33 so as to be immovable in the radial direction but movable in the axial direction relative to the rear end portion of the first ferrule containing portion 33.

Referring to FIG. 7, the fitting portion 35 is disposed on the front end portion of the first housing 32. The fitting portion 35 has a function of separably coupling the first connection retaining member 31 and the second connection retaining member 41 to each other. Here, the phrase "separably couple" means that the fitting portion 35 has a function of switching between a state in which the first connection retaining member 31 and the second connection retaining member 41 are engaged with each other and inseparable from each other and a state in which the first connection retaining member 31 and the second connection retaining member 41 are disengaged from each other and separable from each other.

The fitting portion 35 protrudes from the front end portion of the first housing 32 in the axial direction and has a cylindrical shape as a whole. The inside of the fitting portion 35 is continuous with the first ferrule containing portion 33, and the inside diameter of the fitting portion 35 is equal to the diameter of the front end portion of the first ferrule containing portion 33 on the front side of the first step portion 34. The outside diameter of the fitting portion 35 is smaller than the outside diameter of the first housing 32. The outside diameter of the fitting portion 35 is equal to or slightly smaller than the inside diameter of a fitting hole 45, which is formed in a second housing 42 of the second connection retaining member 41 as described below. Referring to FIG. 3, the fitting portion 35 is fitted into the fitting hole 45.

Referring to FIG. 5, a pair of engagement projections 36 are disposed on the fitting portion 35. The engagement projections 36 have a function of maintaining a state in which the first connection retaining member 31 and the second connection retaining member 41 are coupled to each other. The engagement projections 36 project from the outer peripheral surface of the fitting portion 35 outward in the radial direction. Referring to FIG. 6, the pair of engagement projections 36 are located on the outer peripheral surface of the fitting portion 35 so as to be separated from each other in the circumferential direction by, for example, 180 degrees. The engagement projections 36 engage with engagement holes 46, which are formed in the second housing 42 of the second connection retaining member 41 as described below. The engagement projections 36 and the engagement holes 46 form a bayonet engagement mechanism. The fitting portion 35 and the engagement projections 36 are a specific example of a "first coupling portion". The engagement projections 36 and the engagement holes 46 are a specific example of an "engagement mechanism".

Referring to FIG. 5, a first slit 37 is formed in the first housing 32. The first slit 37 is formed in a part of a peripheral portion of the first housing 32 and in a part of a peripheral portion of the fitting portion 35. The first slit 37 extends through the peripheral portion of the first housing 32 and the peripheral portion of the fitting portion 35 in the axial direction. Referring to FIG. 6, the first slit 37 connects the inside of the first ferrule containing portion 33 and the outside of the first housing 32 to each other and connects the inside of the fitting portion 35 and the outside of the fitting portion 35 to each other. The first slit 37 has a width that is smaller than the maximum outside diameter of the first ferrule 21 (in the present embodiment, the outside diameter of the flange portion 25) and greater than or equal to the outside diameter of the first optical fiber cable 11. Because the first slit 37 has a width that is greater than or equal to the outside diameter of the first optical fiber cable 11, when connecting the first optical fiber cable 11 and the second optical fiber cable 12 to each other or when separating the first optical fiber cable 11 and the second optical fiber cable 12 from each other, it is possible to insert the first ferrule 21 into the first ferrule containing portion 33 or pull out the first ferrule 21 from the first ferrule containing portion 33 by passing the first optical fiber cable 11 through the first slit 37. Because the first slit 37 has a width that is smaller than the maximum outside diameter of the first ferrule 21, it is possible to prevent the first ferrule 21, which is contained in the first ferrule containing portion 33, from being easily pulled out of the first ferrule containing portion 33. In the present embodiment, the first slit 37 has a width that is smaller than the minimum outside diameter of the first ferrule 21 and greater than or equal to the outside diameter of the first optical fiber cable 11. Thus, it is possible to stably support the first ferrule 21 in the first ferrule containing portion 33 so as to be immovable in the radial direction.

Referring to FIG. 5, a first grip portion 38 in formed on a rear end portion of the first housing 32. The first grip portion 38 is formed by shaping the outer periphery of the first housing 32 so as to have, for example, a substantially quadrangular cross-sectional shape. When connecting the first optical fiber cable 11 and the second optical fiber cable 12 to each other or separating the first optical fiber cable 11 and the second optical fiber cable 12 from each other, a user can easily hold the first connection retaining member 31 by pinching the first grip portion 38 with his/her fingers. To engage the engagement projections 36 with the engagement holes 46, the user can easily rotate the first connection retaining member 31 around the axis relative to the second connection retaining member 41 by pinching the first grip portion 38 with his/her fingers. Moreover, it is possible to prevent the optical connector 1 from rolling and becoming instable when, for example, mounting the optical connector 1 on a substrate.

Figure 8:
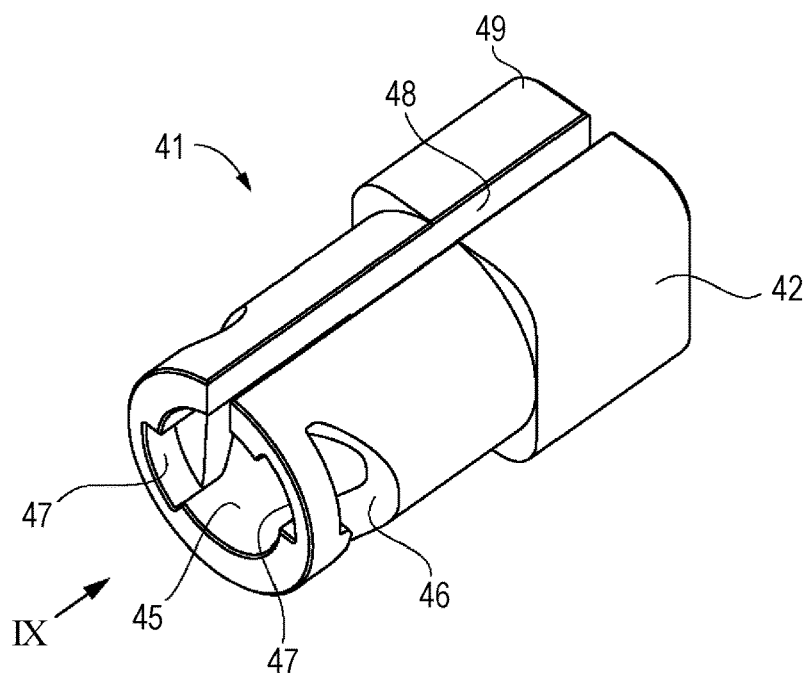
FIG. 8 is an external perspective view of a second connection retaining member of the optical connector according to the embodiment of the present invention.
Figure 9:
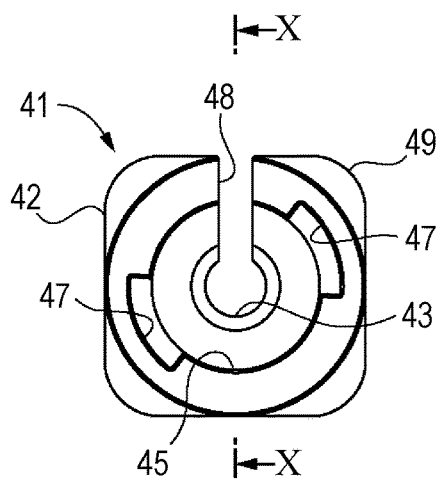
FIG. 9 is an external view of the second connection retaining member, seen in the direction of arrow IX in FIG. 8.
Figure 10:
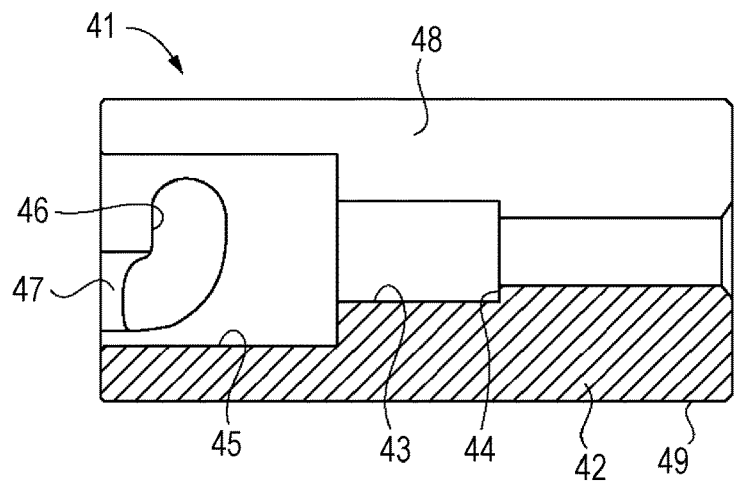
FIG. 10 is a sectional view of the second connection retaining member, taken along line X-X in FIG. 9.

FIGS. 8 to 10 illustrate the second connection retaining member 41. To be specific, FIG. 8 is an external perspective view of the second connection retaining member 41; FIG. 9 is an external view of the second connection retaining member 41, seen in the direction of arrow IX in FIG. 8; and FIG. 10 is a sectional view of the second connection retaining member 41, taken along line X-X in FIG. 9.

Referring to FIG. 8, the second connection retaining member 41 includes the second housing 42. As with the first housing 32, the second housing 42 is made of, for example, a resin material, and the second housing 42 has a columnar shape as a whole. Referring to FIG. 10, a hole is formed in the second housing 42 so as to extend through a central portion of the second housing 42 in the axial direction, and a second ferrule containing portion 43 is formed in the hole. The second ferrule containing portion 43 is a circular hole, and the diameter of the second ferrule containing portion 43 is the same as that of the first ferrule containing portion 33. Referring to FIG. 3, the second ferrule 22, to which the sleeve 27 is attached, is contained in the second ferrule containing portion 43. The second ferrule containing portion 43 is a specific example of a "second containing portion".

Referring to FIG. 10, in the second housing 42, a second step portion 44 is disposed in a rear end portion of the second ferrule containing portion 43. The second step portion 44 has a function of pressing the second ferrule 22, which is contained in the second ferrule containing portion 43, toward the first ferrule 21 in the axial direction. The second step portion 44 is formed by reducing the diameter of a rear end portion of the hole that forms the second ferrule containing portion 43. Referring to FIG. 3, a surface of the flange portion 25 of the second ferrule 22 facing toward the rear end of the second ferrule 22 is in contact with the second step portion 44. The second step portion 44 is a specific example of a "second pressing portion". The diameter of a rear end portion of the second ferrule containing portion 43 on the rear side of the second step portion 44 is the same as the diameter of a the rear end portion of the first ferrule containing portion 33 on the rear side of the first step portion 34. The rear end portion of the capillary supporting portion 24 of the second ferrule 22 is supported by the rear end portion of the second ferrule containing portion 43 so as to be immovable in the radial direction but movable in the axial direction relative to the rear end portion of the second ferrule containing portion 43.

Referring to FIG. 10, the second housing 42 has the fitting hole 45 in a front end portion thereof. The fitting hole 45 has a function of separably coupling the first connection retaining member 31 and the second connection retaining member 41 to each other. The fitting hole 45 is a circular hole formed in the front end portion of the second housing 42 so as to extend in in the axial direction. The inside of the fitting hole 45 is connected to the second ferrule containing portion 43. The diameter of the fitting hole 45 is greater than the diameter of the second ferrule containing portion 43. The diameter of the fitting hole 45 is equal to or slightly greater than the outside diameter of the fitting portion 35, which is formed in the first housing 32 of the first connection retaining member 31. Referring to FIG. 3, the fitting portion 35 is fitted into the fitting hole 45.

Referring to FIG. 8, the fitting hole 45 includes the pair of engagement holes 46. The engagement holes 46 have a function of maintain a state in which the first connection retaining member 31 and the second connection retaining member 41 are coupled to each other. The engagement holes 46 are formed in the peripheral wall of the fitting hole 45. The pair of the engagement holes 46 are located in the peripheral wall of the fitting hole 45 so as to be separated from each other in the circumferential direction by, for example, 180 degrees. The engagement holes 46 each have a shape that is elongated in the circumferential direction of the fitting hole 45. The engagement holes 46 engage with the engagement projections 36, which are formed on the first housing 32 of the first connection retaining member 31. Grooves 47, for guiding the engagement projections 36 into the engagement holes 46, are formed in the inner peripheral portion of the front end portion of the fitting hole 45.

Referring to FIG. 8, a second slit 48 is formed in the second housing 42. The second slit 48 is formed in a part of a peripheral portion of the second housing 42. The second slit 48 extends through the peripheral portion of the second housing 42 in the axial direction. Referring to FIG. 9, the second slit 48 connects the inside of the second ferrule containing portion 43 and the outside of the second housing 42 to each other (and also connects the inside of the fitting hole 45 and the outside of the fitting hole 45 to each other). The second slit 48 has a width that is smaller than the maximum outside diameter of the second ferrule 22 and greater than or equal to the outside diameter of the second optical fiber cable 12. In the present embodiment, the second slit 48 has a width that is smaller than the minimum outside diameter of the second ferrule 22 and greater than or equal to the outside diameter of the second optical fiber cable 12. The second slit 48 has the same operational effects as the first slit 37 of the first housing 32.

Referring to FIG. 8, a second grip portion 49 is formed on a rear end portion of the second housing 42. The second grip portion 49 has the same operational effects as the first grip portion 38 formed on the first housing 32.

Referring to FIG. 3, the coil spring 51 generates a force with which the front end surface 23A of the capillary 23 of the first ferrule 21 and the front end surface 23A of the capillary 23 of the second ferrule 22 press against each other. In the present embodiment, the coil spring 51 is disposed between the first ferrule 21 and the first step portion 34. Referring to FIG. 4, the coil spring 51 is mounted on the outer periphery of the front end portion of the capillary supporting portion 24 of the first ferrule 21. Referring to FIG. 3, in a state in which the first connection retaining member 31 and the second connection retaining member 41 are coupled to each other, the coil spring 51 is pressed by the first step portion 34 and is elastically compressed in the axial direction. Thus, the coil spring 51 generates a force that is appropriate for forming physical contact between the front end surface 23A of the capillary 23 of the first ferrule 21 and the front end surface 23A of the capillary 23 of the second ferrule 22. The coil spring 51 is a specific example of an "elastic member".

Figure 11A:
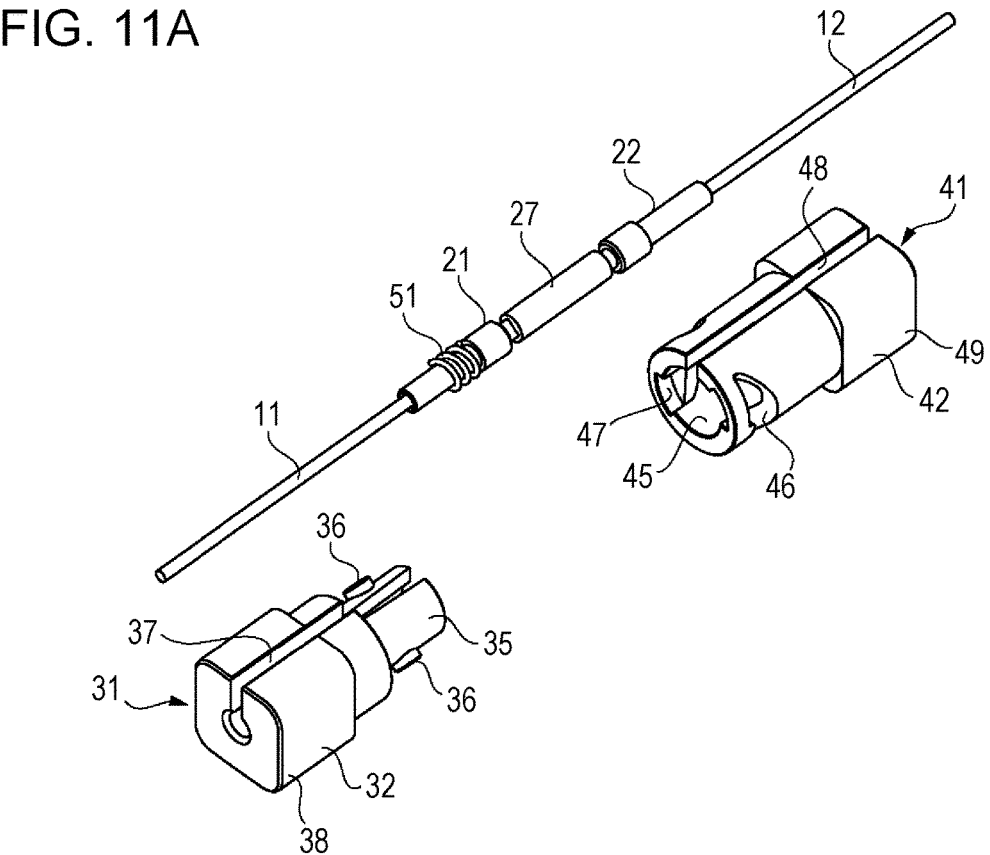
FIGS. 11A and 11B illustrate a process of assembling the optical connector according to the embodiment of the present invention (a method for connecting optical fiber cables).
Figure 11B:
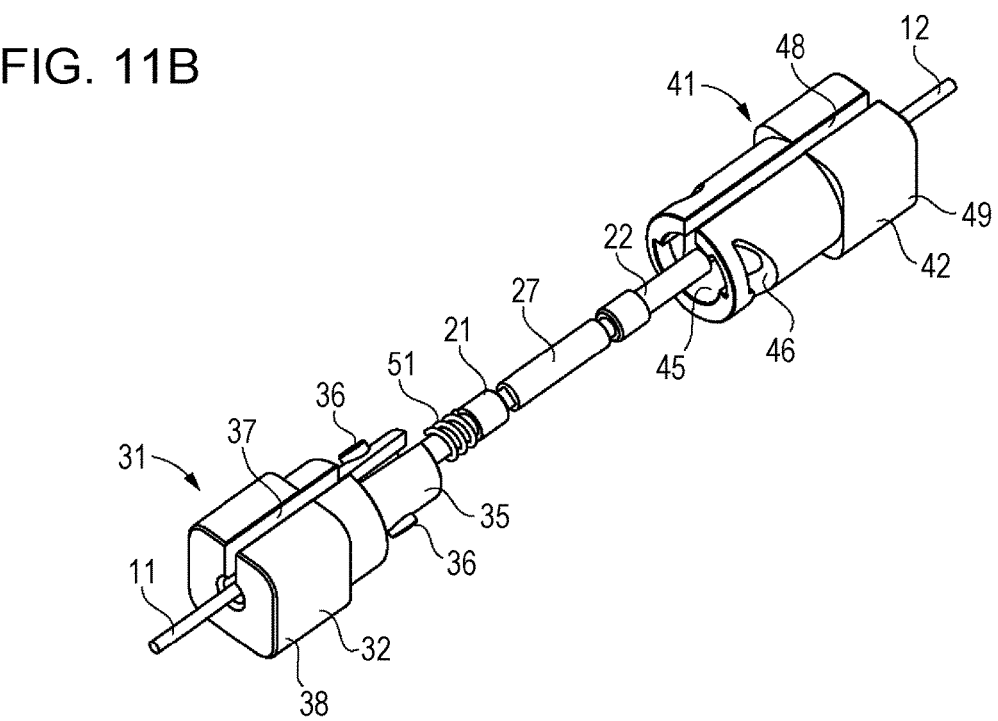

FIGS. 11A and 11B illustrate a method for connecting the first optical fiber cable 11 and the second optical fiber cable 12 to each other by using the optical connector 1. First, the first ferrule 21 is attached to an end portion of the first optical fiber cable 11, and the second ferrule 22 is attached to an end portion of the second optical fiber cable 12. Next, the coil spring 51 is mounted on the capillary supporting portion 24 of the first ferrule 21. The coil spring 51 may be put on the first optical fiber cable 11 before attaching the first ferrule 21 to the first optical fiber cable 11. Alternatively, the coil spring 51 may be put on the optical fiber cable 11 by screwing the coil spring 51 from a side of the first optical fiber cable 11 after attaching the first ferrule 21 to the first optical fiber cable 11.

Next, referring to FIG. 11A, the capillary 23 of the first ferrule 21 and the capillary 23 of the second ferrule 22 are inserted into the sleeve 27 from both ends of the sleeve 27. Thus, the front end portion of the capillary 23 of the first ferrule 21 and the front end portion of the capillary 23 of the second ferrule 22 are positioned on the same axis so as to face each other (positioning step).

Next, referring to FIG. 11B, the first optical fiber cable 11, to which the first ferrule 21 has been attached, is passed through the first slit 37 of the first connection retaining member 31, and the first optical fiber cable 11 is placed into the first ferrule containing portion 33. Next, the second optical fiber cable 12, to which the second ferrule 22 has been attached, is passed through the second slit 48 of the second connection retaining member 41, and the second optical fiber cable 12 is placed into the second ferrule containing portion 43. Next, the first connection retaining member 31 and the second connection retaining member 41 are moved closer to each other. Thus, the coil spring 51 and the first ferrule 21 are contained the first ferrule containing portion 33, and the second ferrule 22 is contained in the second ferrule containing portion 43 (containing step).

Next, the fitting portion 35 is fitted into the fitting hole 45 while positioning the sleeve 27, into which the capillary 23 of the first ferrule 21 and the capillary 23 of the second ferrule 22 have been inserted, inside of the fitting portion 35. At this time, the engagement projections 36 are passed through the grooves 47, which are formed in the front end portion of the second housing 42, and placed into the engagement holes 46. Then, small forces are applied to the first connection retaining member 31 and the second connection retaining member 41 so that the first connection retaining member 31 and the second connection retaining member 41 press against each other in the axial direction. By doing so, the coil spring 51 contracts, and the front end surface 23A of the capillary 23 of the first ferrule 21 and the front end surface 23A of the capillary 23 of the second ferrule 22 closely contact each other (pressing step).

Next, the first connection retaining member 31 is rotated by about 45 degrees relative to the second connection retaining member 41 in a circumferential direction (the clockwise direction in FIG. 11B). Thus, the engagement projections 36 engage with the engagement holes 46 (engagement step). After the engagement projections 36 have engaged with the engagement holes 46, the coil spring 51 continues to be in a compressed state. As a result, as illustrated in FIGS. 1 to 3, a state in which the front end surface 23A of the capillary 23 of the first ferrule 21 and the front end surface 23A of the capillary 23 of the second ferrule 22 are in close contact with each other is maintained. That is, a state in which physical contact is formed between the end surface of the optical fiber 13 of the first optical fiber cable 11 and the end surface of the optical fiber 13 of the second optical fiber cable 12 is maintained. Moreover, a state in which the engagement projections 36 are pressed against edges of the engagement holes 46 due to the elastic force of the coil spring 51 and the engagement projections 36 are engaged with the engagement holes 46 is maintained.

In a state in which the first connection retaining member 31 and the second connection retaining member 41 are coupled to each other as illustrated in FIG. 1, by rotating the first connection retaining member 31 by about 45 degrees relative to the second connection retaining member 41 in a circumferential direction (the counterclockwise direction in FIG. 1), it is possible to disengage the engagement projections 36 and the engagement holes 46 from each other and to separate the first connection retaining member 31 and the second connection retaining member 41 from each other. It is possible to remove the first connection retaining member 31 from the first ferrule 21, to which the first optical fiber cable 11 is attached, by passing the first optical fiber cable 11 through the first slit 37 after moving the first connection retaining member 31 toward the rear side in the axial direction relative to the first ferrule 21, which is contained in the first ferrule containing portion 33. Likewise, it is possible to remove the second connection retaining member 41 from the second ferrule 22, to which the second optical fiber cable 12 is attached, by passing the second optical fiber cable 12 through the second slit 48 after moving the second connection retaining member 41 toward the rear side in the axial direction relative to the second ferrule 22, which is contained in the second ferrule containing portion 43.

As described above, the optical connector 1 according to the embodiment of the present invention connects the first optical fiber cable 11 and the second optical fiber cable 12 to each other by containing the first ferrule 21 and the second ferrule 22, which have been attached to the sleeve 27, respectively in the first connection retaining member 31 and the second connection retaining member 41 and by coupling the first connection retaining member 31 and the second connection retaining member 41 to each other. Thus, with the optical connector 1, optical fiber cables can be connected to each other by using a simple structure.

The components of the optical connector 1 are the sleeve 27, the first connection retaining member 31, the second connection retaining member 41, and the coil spring 51. Thus, with the optical connector 1, the number of components of the optical connector can be reduced.

In the optical connector 1, the sleeve 27 is a metal piece having a simple cylindrical shape; the first connection retaining member 31 and the second connection retaining member 41 are each a single member having a simple shape, which can be easily formed, for example, by resin molding (without assembling a plurality of parts); and the coil spring 51 is a simple metal piece. Thus, with the optical connector 1, each of the components of the optical connector can have a simple structure.

In the optical connector 1, the coil spring 51, the first ferrule 21, and the second ferrule 22 are pressed by the first step portion 34 and the second step portion 44, so that physical contact is formed between the optical fiber 13 of the first optical fiber cable 11 and the optical fiber 13 of the second optical fiber cable 12. Thus, with the optical connector 1, a pressing force needed to form physical contact between optical fibers can be formed with a simple structure. In the optical connector 1, a pressing force for forming physical contact between optical fibers can be generated by only coupling the first connection retaining member 31 and the second connection retaining member 41 to each other. In the optical connector 1, physical contact between optical fibers can be formed by using the single coil spring 51, so that the number of components and man-hour required for assembly can be reduced.

With exiting technologies, in order to connect optical fiber cables to each other, it is necessary to use a relay adapter including an independent housing having a structure for positioning front end portions of respective ferrules and a structure that engages housings of two optical connectors with the housing of the relay adapter so as to face each other. In contrast, with the optical connector 1 according to the embodiment of the present invention, such a relay adapter is not necessary. The optical connector 1 can realize the function of the existing relay adapter (function of engaging and coupling two optical connectors with each other while positioning two optical fibers) by using a simple structure that contains the sleeve 27, into which the front end portion of the capillary 23 of the first ferrule 21 and the front end portion of the capillary 23 of the second ferrule 22 are inserted, inside the fitting portion 35 of the first connection retaining member 31 and that couples the first connection retaining member 31 and the second connection retaining member 41 to each other.

As described above, with the optical connector 1 according to the embodiment of the present invention, it is possible to simplify the structure of the optical connector, and therefore it is possible to reduce the size and the cost of the optical connector.

In the optical connector 1 according to the embodiment of the present invention, the first slit 37 and the second slit 48 are respectively formed in the first connection retaining member 31 and the second connection retaining member 41. Thus, in a state in which the first ferrule 21 is attached to the first optical fiber cable 11, it is possible to remove the first connection retaining member 31 from the first ferrule 21 or to attach the first connection retaining member 31 to the first ferrule 21. Likewise, in a state in which the second ferrule 22 is attached to the second optical fiber cable 12, it is possible to remove the second connection retaining member 41 from the second ferrule 22 or to attach the second connection retaining member 41 to the second ferrule 22. Accordingly, assembling or disassembling of the optical connector 1 can be easily performed; and maintenance operations, such as replacement of the optical fiber cables 11 and 12 and replacement or cleaning of optical-fiber protection tubes, which are attached to the outer peripheries of the optical fiber cables 11 and 12, can be easily performed.

In the embodiment described above, the sleeve 27, having a cylindrical shape, is used as an example of a positioning member. Alternatively, a positioning member may have a bar-like shape having a C-shaped cross section. If the positioning member has a bar-like shape having a C-shaped cross section, preferably, the inside diameter of the positioning member is smaller than or equal to the outside diameter of the capillary 23. With this structure, when the capillary 23 is inserted into the C-shaped positioning member, the positioning member is elastically deformed and the diameter of the positioning member increases, and the positioning member presses the outer peripheral surface of the capillary 23. As a result, the capillary 23 is supported by the positioning member. Thus, when connecting the optical fiber cables 11 and 12 to each other by using the optical connector 1, by inserting the capillary 23 of the first ferrule 21 and the capillary 23 of the second ferrule 22 into the C-shaped positioning member from both ends of the C-shaped positioning member, the first ferrule 21 and the second ferrule 22 can be temporarily fixed to each other (maintained in a coupled state) via the positioning member. Accordingly, an operation of connecting the optical fiber cables 11 and 12 to each other can be easily performed.

In the embodiment described above, the upper limit of the width of the first slit 37 of the first connection retaining member 31 is set smaller than the maximum outside diameter of the first ferrule 21, so that the first ferrule 21 is prevented from being easily pulled out of the first connection retaining member 31. However, the width of the first slit 37 may be set greater than or equal to the maximum outside diameter of the first ferrule 21. The width of the second slit 48 of the second connection retaining member 41 may be set greater than or equal to the maximum outside diameter of the second ferrule 22. Also with such a structure, when the first connection retaining member 31 and the second connection retaining member 41 are made to engage with each other by inserting the first ferrule 21 and the second ferrule 22 thereinto, it is possible to prevent the first ferrule 21 from being pulled out of the first connection retaining member 31 by positioning the first slit 37 and the second slit 48 so as to be displaced from each other in the circumferential direction. Likewise, it is possible to prevent the second ferrule 22 from being pulled out of the second connection retaining member 41.

In the embodiment described above, the engagement mechanism is a bayonet engagement mechanism in which the engagement projections 36 are inserted into the engagement holes 46 and the engagement projections 36 are moved relative to the engagement holes 46 to be engaged with the engagement holes. Alternatively, the engage mechanism may be a screw mechanism or a push-pull mechanism.

In the embodiment described above, the coil spring 51 is disposed between the first ferrule 21 and the first step portion 34. Alternatively, the coil spring 51 may be disposed between the second ferrule 22 and the second step portion 44. As described above, the number of components can be reduced by using only one coil spring 51. However, two coil springs 51 may be respectively disposed at a position between the first ferrule 21 and the first step portion 34 and at a position between the second ferrule 22 and the second step portion 44.

In the embodiment described above, a case where the optical connector 1 includes the sleeve 27, the first connection retaining member 31, the second connection retaining member 41, and the coil spring 51 is described as an example. However, the present invention is not limited to such an example. An optical connector may include the sleeve 27, the first connection retaining member 31, and the coil spring 51, without including the second connection retaining member 41. In this case, the second connection retaining member 41 is a specific example of a mating ferrule holding member, and the second ferrule 22 contained in the second connection retaining member 41 is a specific example of a mating ferrule. Alternatively, an optical connector may include the sleeve 27, the second connection retaining member 41, and the coil spring 51, without including the first connection retaining member 31. In this case, the first connection retaining member 31 is a specific example of a mating ferrule holding member, and the first ferrule 21 contained in the first connection retaining member 31 is a specific example of a mating ferrule.

The present invention can be appropriately modified within the spirit and scope of the present invention that can be understood from the claims and the entirety of the specification, and an optical connector and a method for connecting optical fiber cables according to any of such modifications are within the technical scope of the present invention.

What is claimed is:

1. An optical connector comprising:
 a positioning member that is attached to a front end portion of a first ferrule attached to a first optical fiber cable and to a front end portion of a second ferrule attached to a second optical fiber cable, the positioning member positioning the front end portion of the first ferrule and the front end portion of the second ferrule so as to face each other on the same axis;
 a first connection retaining member and a second connection retaining member that maintain a state in which the front end portion of the first ferrule and the front end portion of the second ferrule contact each other and press against each other; and
 an elastic member that generates a force with which the front end portion of the first ferrule and the front end portion of the second ferrule press against each other,
 wherein the first connection retaining member includes
  a first housing,
  a first containing portion that is a hole extending through a central portion of the first housing in an axial direction and that contains therein the first ferrule to which the positioning member is attached,
  a first pressing portion that is disposed in the first housing and that presses the first ferrule contained in the first containing portion toward the second ferrule in the axial direction,
  a first coupling portion that is disposed on the first housing and that is separably coupled to the second connection retaining member, and
  a first slit that extends through a peripheral portion of the first housing in the axial direction, that connects an inside of the first containing portion and an outside of the first housing to each other, and that has a width greater than or equal to an outside diameter of the first optical fiber cable,
 wherein the second connection retaining member includes
  a second housing,
  a second containing portion that is a hole extending through a central portion of the second housing in the axial direction and that contains therein the second ferrule to which the positioning member is attached,
  a second pressing portion that is disposed in the second housing and that presses the second ferrule contained in the second containing portion toward the first ferrule in the axial direction,
  a second coupling portion that is disposed in the second housing and that is separably coupled to the first coupling portion, and
  a second slit that extends through a peripheral portion of the second housing in the axial direction, that connects an inside of the second containing portion and an outside of the second housing to each other, and that has a width greater than or equal to an outside diameter of the second optical fiber cable, and
 wherein the elastic member is disposed at at least one of a position between the first ferrule and the first pressing portion and a position between the second ferrule and the second pressing portion.

2. The optical connector according to claim 1, wherein the first pressing portion is a step portion where a diameter of the hole that forms the first containing portion is reduced, and the second pressing portion is a step portion where a diameter of the hole that forms the second containing portion is reduced.

3. The optical connector according to claim 1, wherein the first coupling portion protrudes from a front end portion of the first housing in the axial direction, the second coupling portion is a hole formed in a front end portion of the second housing so as to extend in the axial direction, and the first coupling portion and the second coupling portion are coupled to each other as the first coupling portion is fitted into the second coupling portion.

4. The optical connector according to claim 1, wherein the first coupling portion and the second coupling portion each include an engagement mechanism that maintains a state in which the first coupling portion and the second coupling portion are coupled to each other.

5. The optical connector according to claim 1, wherein the positioning member has a cylindrical shape or a bar-like shape having a C-shaped cross section, and the positioning member is contained in the first connection retaining member or in the second connection retaining member in a state in which the front end portion of the first ferrule is inserted into the positioning member from one end portion of the positioning member and the front end portion of the second ferrule is inserted into the positioning member from the other end portion of the positioning member.

* * * * *